United States Patent
Zhao et al.

(10) Patent No.: US 8,557,384 B2
(45) Date of Patent: Oct. 15, 2013

(54) SILICATE-CONTAINING ANTIFOG COATINGS

(75) Inventors: Chen Zhao, Newark, DE (US); Cornell Chappell, Jr., Petersburg, VA (US)

(73) Assignee: DuPont Teijin Films U.S. Limited Partnership, Chester, VA (US)

( * ) Notice: Subject to any disclaimer, the term of this patent is extended or adjusted under 35 U.S.C. 154(b) by 205 days.

(21) Appl. No.: 12/918,758

(22) PCT Filed: Feb. 18, 2009

(86) PCT No.: PCT/US2009/034358
§ 371 (c)(1),
(2), (4) Date: Aug. 20, 2010

(87) PCT Pub. No.: WO2009/105443
PCT Pub. Date: Aug. 27, 2009

(65) Prior Publication Data
US 2011/0003160 A1    Jan. 6, 2011

Related U.S. Application Data

(60) Provisional application No. 61/066,543, filed on Feb. 21, 2008.

(51) Int. Cl.
*B32B 27/00* (2006.01)
*C09K 3/18* (2006.01)

(52) U.S. Cl.
USPC ............... 428/410; 428/307.3; 428/307.7; 428/308.4; 428/312.6; 428/312.8; 428/428; 428/429; 106/13

(58) Field of Classification Search
USPC ........... 428/34.5, 307.7, 307.3, 312.6, 312.8, 428/410, 428–429; 106/13
See application file for complete search history.

(56) References Cited

U.S. PATENT DOCUMENTS

| | | |
|---|---|---|
| 4,008,203 A | 2/1977 | Jones |
| 5,302,327 A | 4/1994 | Chu et al. |
| 5,451,460 A | 9/1995 | Lu et al. |
| 5,460,918 A | 10/1995 | Ali et al. |
| 5,494,774 A | 2/1996 | Ali et al. |
| 5,814,684 A | 9/1998 | Yoshioka |
| 5,882,798 A | 3/1999 | Hubbard et al. |
| 5,925,428 A | 7/1999 | Hubbard et al. |
| 6,506,446 B2 | 1/2003 | Yamamoto et al. |
| 6,517,619 B1 | 2/2003 | Nowak et al. |
| 6,923,997 B2 | 8/2005 | Patchen |
| 7,300,513 B2 | 11/2007 | Momose |
| 7,504,156 B2 * | 3/2009 | Iyer et al. .................. 428/447 |
| 7,731,881 B2 * | 6/2010 | Dean et al. ................ 264/232 |

FOREIGN PATENT DOCUMENTS

| | | |
|---|---|---|
| CN | 101033363 | 9/2007 |
| EP | 0 408 197 | 1/1991 |
| EP | 0 747 460 A1 | 12/1996 |
| JP | 2001 316626 | 11/2001 |
| JP | 2004 315730 | 11/2004 |
| WO | WO 2005/066257 | 7/2005 |

OTHER PUBLICATIONS

First Office Action dated Dec. 13, 2011, for Chinese Patent Application No. 200980105998.9 (Translation attached).
Falter, J. A., "Improved Performance Properties of PVC Food Wrap Film," *Journal of Vinyl Technology*, 13(3):156-159, Sep. 1991.
Frison, Céline, International Search Report, Jun. 16, 2009, 2 pgs.

* cited by examiner

*Primary Examiner* — Cathy Lam
(74) *Attorney, Agent, or Firm* — RatnerPrestia

(57) ABSTRACT

A coating composition comprising an alkali metal silicate, a wetting agent, and a hydrophilic antifog agent forms an antifog coating on a substrate. The coating may be applied to the surface of a film from an aqueous dispersion of the ingredients, followed by drying to form a composite film.

14 Claims, No Drawings

SILICATE-CONTAINING ANTIFOG COATINGS

This application is a national phase filing of PCT Application No. U.S. 09/034,358, filed 18 Feb. 2009, and claims priority of U.S. provisional Application No. 61/066,543, filed 21 Feb. 2008, the entireties of which applications are incorporated herein by reference.

BACKGROUND OF THE INVENTION

Glass or plastic materials used for windows, mirrors, lenses, goggles, and facial masks or shields become foggy when they are exposed to high humidity and temperature, or used at interfacial boundaries with a large difference in temperature or humidity. Products exposed to such conditions include those used in medical, military and industrial safety applications. Fog is caused by the condensation of moisture on the surface. For example, exhaled air from a person wearing a safety shield could cause fogging. To reduce or eliminate this problem, antifog coatings are frequently needed.

Antifog coatings may also be needed for use on disposable items such as single-use facemasks, which typically are based on polymer film substrates. For these and other applications, it is desirable that cost be kept to a minimum, and therefore in-line application methods would in many cases be desirable in order to keep costs low. However, existing antifog compositions capable of providing suitable antifog properties are often not easily applied by in-line processes. There is a continuing need for antifog coatings, and methods of applying them, capable of addressing these needs.

SUMMARY OF THE INVENTION

In one aspect, the invention provides a composite film including a polyester film substrate having first and second sides, and on at least one of those sides a coating composition including an alkali metal silicate, a wetting agent, and a hydrophilic antifog agent.

In another aspect, the invention provides a method of making a composite film. The method, includes the steps of:
a) providing an unoriented or monoaxially oriented polyester film substrate having first and second sides;
b) forming on at least one of the first and second sides a layer of a coating composition including an alkali metal silicate, a wetting agent, and a hydrophilic antifog agent, the forming including contacting the at least one side with a dispersion of the composition in an aqueous diluent and then evaporating the diluent; and
c) subsequent to step b), stretching the unoriented or monoaxially oriented polyester film substrate to respectively monoaxially or biaxially orient the substrate.

In still another aspect, the invention provides a polymeric or glass article having on a surface thereof a coating composition including an alkali metal silicate, a wetting agent, and a hydrophilic antifog agent.

In a further aspect, the invention provides a formulation including, in an aqueous diluent, a dispersion of a composition including an alkali metal silicate, a wetting agent, and a hydrophilic antifog agent.

In a still further aspect, the invention provides a film including an alkali metal silicate, a wetting agent, and a hydrophilic antifog agent.

DETAILED DESCRIPTION OF THE INVENTION

The present invention provides polyester films bearing on their surface an antifog composition. Depending on the intended application for the polyester film, the coating may be applied to one or both sides of the film. If both sides are coated, the to same composition will typically be used for both, although different ones may be used.

As will be discussed in detail further below, antifog coating compositions may be applied by in-line or off-line processes, with the former being preferred in some embodiments. However, the studies leading up to this invention revealed that traditional formulations for forming antifog coatings are often not suitable for is application prior to a subsequent draw step (for example, during the interdraw phase, i.e., between a first and a second drawing step) in an in-line process, because the draw results in crazes and/or cracks in the coating. This results in deteriorated optical properties. The compositions described herein may be used for either type of coating process without cracking or crazing, and thus represent a significant advance in antifog coating technology. Further, the resulting coatings may be quite thin, allowing additional cost reduction.

Although one particularly useful application of the coating compositions of this invention is for coating films, the compositions may be applied to the surface of any article. Polymeric or glass articles may be of particular utility, especially if they are transparent. Exemplary glass articles include films, sheets/plates, mirrors, and eyeglasses or other optical devices. Aqueous dispersions of the compositions, and dried films made from the compositions, are also embodiments of the invention without respect to whether they are in the form of coatings on a substrate.

Coating compositions useful for practicing the invention will now be described with respect to the ingredients that are used to prepare them. The skilled artisan will be aware that a variety of chemical reactions (for example, crosslinking) may occur between the various components either before or after application and drying, and accordingly when compositions are described they are meant to refer both to the ingredients themselves and to the products of such reactions, if any. The term "active ingredients" will mean all ingredients other than water or other volatile diluent.

Antifog Coating Compositions

Coating compositions according to the invention contain an alkali metal silicate, a wetting agent, and a hydrophilic antifog agent. Typically, these are dispersed in a volatile carrier such as water, which may (except for the possible addition of small amounts of other additives) constitute the balance of the composition.

The alkali metal silicate is typically potassium silicate. However, in some embodiments, sodium silicate may be used to partially or completely replace potassium silicate. Alkali metal silicates are widely available from a variety of commercial suppliers such as Ineos Silica Ltd. of Warrington, Cheshire, UK. The alkali metal silicate will typically be present in at least a 0.025 wt % level, and more typically at least 0.05 wt %. Typically, it will be at most 0.25 wt %, and more typically at most 0.15 wt %.

Other exemplary wetting agents include RENEX® 690 Polyoxyethylene (10) nonylphenol From Uniqema, CAFLON® NP10 isononylphenyl ethoxylate from Univar Ltd., and fluorosurfactants such as ZONYL® FSN, FS-500, FS-510, FSO, FSE, FS610 etc. surfactants from DuPont and Lodyne® S-110, S-152B etc. surfactants from Ciba Specialty Chemicals.

Suitable wetting agents also include any of a variety of polysiloxane- or silicone-based surfactants, including those bearing polyether (e.g., polyoxyalkylene) substituents. These include nonionic varieties such as TEGO-WET® 251 polyether modified polysiloxane surfactant (Tego Chemie Service GmbH, Division of Degussa, Essen, Germany. The wetting agent will typically be present in at least a 0.2 wt % level, and more typically at least 0.4 wt %. Typically, it will be at most 2 wt %, and more typically at most 1 wt %.

Suitable hydrophilic antifog agents include GLYCOL-UBE® AFA-1 mixture of triglyceryl monooleate, sorbitan monooleate ethoxylate, and glycerine from Lonza, Inc. (Fair Lawn, N.J.); and sodium alkyl sulfates such as WITCO-LATE™ WAQE sodium lauryl sulfate (Akzo Nobel Industrial Specialties, Chicago, Ill.); and BYK® 302, 333 and 348 polyether modified dimethylpolysiloxane copolymers (BYK Additives & Instruments 46483 Wesel, Germany). Typically, the antifog agent has a molecular weight $M_n$ of at most 20,000 Daltons, and usually it is water-soluble. In some embodiments of the invention, the hydrophilic antifog agent is a compound having three or more polyoxyethylene chains, typically OH-terminated on one end, wherein the oxyethylene content is at least 45 wt %. Typically, it is at least 55 wt %, and more typically at least 65 wt %. Examples include certain fatty acid monoesters of sorbitan ethoxylates such as TWEEN®20 polyoxyethylene (20) sorbitan monolaurate (Uniqema, New Castle, Del.). The hydrophilic antifog agent will typically be present in at least a 0.2 wt % level, and more typically at least 0.4 wt %. Typically, it will be at most 2 wt %, and more typically at most 1 wt %.

In some embodiments of the invention, a small amount of a particulate antiblocking agent may be added to the formulation. Exemplary antiblocking agents include crosslinked particulate acrylic (co)polymers such as those sold by Esprix Technologies (Sarasota, Fla.) under the names MX-150, XX-1255Z, and XX-1269Z. If used, the particulate antiblocking agent will typically be present in the composition in an amount of from about 0.01 wt % to about 0.1 wt %, with 0.05 wt % more typically being the upper limit.

In some embodiments of the invention, it is desired that the coated substrate be clear and colorless. In such cases, the coating compositions are essentially free of colorants, dyes, pigments, opacifiers, silver halides, fluorescent or phosphorescent additives, particulate materials, or other materials that significantly affect transparency, color or the like so as not to defeat the purposes of the invention. In some embodiments, the compositions are essentially free of silica particles, including colloidal and precipitated silica particles, and/or essentially free of tetraalkyl orthosilicates or hydrolysis products thereof.

In some embodiments of the invention, it is desired that the coated substrate be free of any material that might result in image formation, such as photosensitizers, photo-activated catalysts, and photopolymerizable or crosslinkable monomers, oligomers, or polymers. In some embodiments, the compositions exclude species (e.g., oligomers or polymers) having a molecular weight $M_n$ greater than 20,000 Daltons. In some embodiments, either or both of the wetting agent and the hydrophilic antifog agent are nonionic, and the compositions are essentially free of anionic or cationic surfactants or polymers.

In some embodiments, any or all of the following classes of polymeric material may be undesirable in certain situations and thus may be excluded from the compositions: polyethylene oxides, polyethylene glycols, polymers with multiple sulfonic groups, polyesters, acrylamide (co)polymers, acrylate salt or ester (co)polymers, N-vinylpyrrolidone (co)polymers, vinyl alcohol (co)polymers, polyurethanes, polyureas, cellulose esters or ethers, epoxide-containing resins, and gelatins.

Coating compositions according to the invention will typically be applied as a dispersion in a volatile diluent, which may include a solvent. In most cases, the diluent will be aqueous, which as used herein means that the diluent is at least 50 wt % water. In some embodiments, the aqueous diluent is at least 90 wt % water, and in many cases it will be 100 wt % water. Such dispersions will typically have total solids in a range from 0.5 to 15 wt %, and more typically in a range of 2 to 5 wt %. As is well known to those skilled in the art, "total solids" refers to the amount of non-volatile material present in the coating composition even though some of the non-volatile material present may be a liquid at room temperature.

The viscosity of the dispersed coating composition will typically be in a range from 1 to 100 Pas for gravure-type coating methods, but can be greater than 100 Pas for other coating methods. In addition, it is desirable that the functional components are compatible with each other to allow dispersed coating composition to be stable in storage and also stable to the conditions (such as high shear) of coating techniques to without particle flocculation, aggregation, crystallization, or other deterioration in properties.

Preparation of Composite Films

Any polymer, typically in the form of a film, is suitable for use as a substrate according to the invention. Thermoplastic polymers are typically used. Non-limiting is examples include polyesters, such as polyethylene terephthalate or polybutylene terephthalate; polyacrylates, such as polymethylmethacrylate; polystyrenes or acrylate copolymers; nylon; polybutyrate; polypropylene; polyethylene; polybutene; olefin copolymers; polycarbonate; and polyacrylonitrile.

The polymeric film may also comprise a polyarylether or thio analogue thereof, particularly a polyaryletherketone, polyarylethersulphone, polyaryletheretherketone, polyaryletherethersuiphone, or a copolymer or thio analogue thereof. Examples of these polymers are disclosed in EP-A-1879, EP-A-184458 and U.S. Pat. No. 4,008,203. The polymeric film may comprise a poly(arylene sulphide), particularly poly-p-phenylene sulphide or copolymers thereof. Blends of the aforementioned polymers may also be employed.

Suitable thermoset resin polymeric materials may also be used as substrates according to the invention. Examples include addition-polymerization resins such as acrylics, vinyls, bis-maleimides and unsaturated polyesters; formaldehyde condensate resins such as condensates with urea, melamine or phenols; cyanate resins; functionalised polyesters; and polyamides or polyimides.

The substrate may in some embodiments be a multi-layer film. For example, the film may comprise a base layer such as polyethylene terephthalate and a heat-sealable layer provided thereon. Such a heat-sealable layer may be provided by coating from a solvent, or by any other means. In some embodiments, it is effected by coextrusion, either by simultaneous coextrusion of the respective film-forming layers through independent orifices die, and thereafter uniting the still molten layers, or preferably, by single-channel coextrusion in which molten stream of the respective polymers are first united within a channel leading to a die manifold, and thereafter extruded together from a die orifice under conditions of streamline flow without intermixing to produce a multi-layer polymeric film, which may be oriented and heat-set as described previously herein.

In some embodiments of the invention, the substrate includes a crystalline polyester prepared from the polycondensation of one or more glycols or diols (such as ethylene or propylene glycol or butane diol) with one or more diacids or esters (typically methyl esters) thereof. Suitable diacids include terephthalic acid, naphthalene dicarboxylic acid, isophthalic acid, diphenic acid and sebacic acid. Exemplary polyester films useful in the present invention include polyethylene terephthalate (PET), polyethylene naphthalate (PEN), polypropylene terephthalate, and polybutylene terephthalate, or mixtures of these, or copolyester films in which any one of the above mentioned polyesters is present. For example, a film of polyethylene terephthalate/isophthalate (PETIP) copolyester may be used according to the invention. Another suitable example is film made from a copolyester of PET and PEN. Typically, PET will be used.

In the typical manufacture of polyester film, polyester resin is melted and extruded as an amorphous sheet onto a polished revolving casting drum to form a cast sheet of the polymer. Thereafter, the cast sheet of polymer is heated to just above its glass transition temperature, 80° C. to 100° C. for polyethylene terephthalate, and is generally stretched or drawn in one or more directions. Typically it is stretched in two directions: the direction of extrusion (longitudinal direction), and perpendicular to the direction of extrusion (transverse direction) to produce a biaxially orientated film. The first stretching, which imparts strength and toughness to the film, conventionally increases the original length of the film by a factor of from about 2.0 to about 4.0. Subsequent stretching steps each also increase the size of the film about 2.0 to about 4.0 times. Generally, it is preferred to stretch first in the longitudinal direction and then in the transverse direction. The film is then heat set, generally at a temperature in the range of about 190° C. to 240° C. for polyethylene terephthalate, to lock in the strength, toughness, and other physical properties, and then cooled down prior to winding on a roll.

The present invention adds to this process a step of coating the substrate with an antifog composition on one or both sides of the film substrate. In the case of a polyester, a number of suitable ways of doing this may be used. The process for coating the antifog composition may be conducted either in-line or off-line. All processes involve a final cooldown step, and as used herein, the term "in-line" refers to a coating process that is performed at any point prior to the final cooldown step, and an "off-line" coating process is one in which the coating step is conducted afterward. Nonlimiting examples of using in-line coating processes to make coated films according to the invention will now be presented, using PET as an exemplary polyester.

In a first embodiment of the invention, PET is dried and then melt-extruded into a flat sheet and cooled on a chilled roll or drum to form a substrate layer. The temperature of the cast film is then increased by passing the film over hot rollers (80° C.-85° C.) and heating by infrared heaters. The film is then stretched lengthwise at a draw ratio of 3.4:1. The stretched film is then contacted with chilled rolls (15° C.-25° C.), which reduces the film temperature to minimize crystallization and embrittlement of the film. The film is then coated on one or both sides with the antifog coating solution. Any suitable roll coating method may be used, or other coating method. The coated film is dried in a tenter frame in two forced air ovens at about 105° C. The film is then drawn in the transverse direction at a ratio of 3.0:1 to 4.5:1 in two ovens operating at 110° C.-130° C. After drawing, the coated film is heat set for about 8 seconds in three heat-setting ovens operating at between 225° C. and 237° C. In a final cooldown step, the film temperature is reduced in an air oven operating at about 165° C.

In another embodiment of the invention, PET is melt-extruded into a flat sheet, cooled on a chilled roll or drum, and passed over hot rollers and heated by infrared heaters as described in the first embodiment. The film is then coated on one or both sides with the antifog coating solution, and then dried in a tenter frame in two forced air ovens at about 105° C. The film is then drawn in both lengthwise and transverse direction at a ratio of 2.0:1 to 5.0:1 in ovens operating at 110° C.-130° C. After drawing, the coated film is heat set and cooled down as described in the first embodiment.

In yet another embodiment of the invention, the process of the first embodiment is repeated but without the transverse drawing step, thereby producing a uniaxially drawn product.

In still another embodiment, the process of the first embodiment is repeated except that the transverse drawing step is replaced by a second lengthwise draw in two ovens operating at 110° C.-130° C. at a draw ratio of 3.0:1 to 4.5:1, thereby producing a monoaxially drawn product.

Any conventional coating method, such as spray coating, roll coating, slot coating, meniscus coating, immersion coating, wire-bar coating, air knife coating, curtain coating, doctor knife coating, direct and reverse gravure coating, and the like, may be used to apply the coating composition. The coating is typically applied as a continuous wet coating having a thickness in a range from 1.0 to 30 microns, and more typically in a range of 5 to 20 microns, as measured by a wet infrared gauge. After drying, the coating typically has a thickness in a range from 0.025 to 1.5 microns, and more typically in a range of 0.060 to 0.16 microns.

In other embodiments of the invention, a conventional off-line coating process may be used, using any of the wide variety of coating methods known in the art. However, the ability to use in-line coating confers advantages of economy and efficiency over off-line processes (in which the coating step could typically only be conducted after the manufacture of the polyester substrate has been completed) because off-line processes may involve organic solvents and/or require the user to employ inconvenient and costly drying procedures. In contrast, in-line coating by the manufacturer provides a customer with a ready-to-use film, thereby saving the customer from having to provide time and equipment to unwind the uncoated film, coat it, and then rewind it.

If an in-line process is used, the coating composition is typically applied before final drawing of the film. For a uniaxially drawn film, the coating composition is preferably applied after drawing. For a biaxially or monoaxially orientated film, the coating composition is typically applied during an interdraw stage, that is, after the film has already been stretched but prior to a second stretching.

In some embodiments, one or (more typically) both sides of the substrate may be coated with a "slip coating" comprising a particulate material in order to assist in the handling of the film, for instance to improve windability and minimize or prevent "blocking". Such a coating may for example be applied in-line after film orientation and before final winding. The slip coating may be applied to either side of the substrate, or both. Suitable slip coatings may comprise potassium silicate, such as that disclosed in, for example, U.S. Pat. Nos. 5,925,428 and 5,882,798, the disclosures of which is incorporated herein by reference. Alternatively, a slip coating may comprise a discontinuous layer of an acrylic and/or methacrylic polymeric resin optionally further comprising a cross-linking agent, as disclosed in, for example, EP-A-0408197.

EXAMPLES

Glossary

The following materials are referred to in the Examples, and are identified here.

K120 potassium silicate solution from INEOS Silica, Ltd. (Warrington, Cheshire, UK) 52% active GLYCOLUBE® AFA-1 mixture of triglyceryl monooleate, sorbitan monooleate ethoxylate, and glycerine from Lonza, Inc. (Fair Lawn, N.J.), 100% active TEGO-WET® 251 polyether modified polysiloxane surfactant (Tego Chemie Service GmbH, Division of Degussa, Essen, Germany), 100% active MX-150 Solid particulate crosslinked acrylic copolymer from Esprix Technologies (Sarasota, Fla.), used as 100% active XX-1255Z Solid particulate acrylic polymer dispersion from Esprix Technologies (Sarasota, Fla.), used as 20% active XX-1269Z Solid particulate acrylic polymer dispersion from Esprix Technologies (Sarasota, Fla.), used as 20% active BYK® 348 polyether modified dimethylpolysiloxane copolymer (BYK-Chemie USA Wallingford, Conn.), 100% active MAZOL® GMO K Kosher glycerol Monooleate (BASF, Mt. Olive, N.J.), 100% active Poly(acrylamide-acrylic acid, Na salt) 40% carboxyl 2-propenoic acid, sodium salt, polymer with 2-propenamide (Polysciences, Inc., Warrington, Pa.), 100% active PRIMAFLO® HP22 polymer solution hydroxypropylcellulose (Hercules Inc Wilmington, Del.), 22% active PVP K-120, 2-Pyrrolidinone, 1-Ethenyl-, Homopolymer (ISP Technologies Inc., Wayne, N.J.), 100% solids S-MAZ® 60K Flake sorbitan Monostearate Kosher (BASF, Mt. Olive, N.J.), 100% solids WITCOLATE™ WAQE sodium lauryl sulfate (Akzo Nobel Industrial Specialties, Chicago, Ill.), 22% active solution SURFYNOL® 420 ethoxylated 2,4,7,9-tetramethyl-5-decyn-4,7-diol (Air Products & Chemical Inc, Allentown, Pa.), used as 100% solution TWEEN®20 polyoxyethylene (20) sorbitan monolaurate (Uniqema, New Castle, Del.), 100% active TWEEN®21 polyoxyethylene (4) sorbitan monolaurate (Uniqema, New Castle, Del.), 100% active Sample Testing Antifog characteristics of films were evaluated by the following method:

Ambient Testing

A sample of film was placed over the mouth of a 4 oz. jar containing 60 ml of water at 50° C., and the assembly was maintained at ambient temperature and the time elapsed until the film surface became visibly foggy was recorded. If no fog was found by 5 minutes elapsed time, the test was discontinued.

Refrigerated Testing

A sample of film was placed over the mouth of a 4 oz. jar containing 60 ml of water at 2-5° C. (35-40° F.). The jar was placed in a refrigerator held at 2-5° C., and the time elapsed until the film surface became visibly foggy was recorded, as well as the time until the fog subsequently disappeared. Finally, the time at which the first condensation (visible droplets of water) appeared was noted. Condensation was evaluated at 1 minute, 2 minutes, 2 hours and 24 hours after placing the film on the jar. A notation that no fog was formed at ambient and refrigerated temperatures means that no fog was visible at any of the 1-minute, 2-minute, 2-hour, or 24-hour evaluations.

Haze, which is caused by light diffused in all directions and which results in a loss of contrast, was also evaluated. ASTM D 1003 defines haze as that percentage of light which in passing through deviates from the incident beam greater than 2.5 degrees on the average. Haze was measured with a BYK Gardner "Haze Gard Plus" instrument (BYK-Gardner USA, Columbia, Md.) using ASTM D 1003-61, procedure A.

Example 1

To produce the coating formulation, the following components were added to 96.8 parts by weight of water under agitation:

0.128 parts by weight of a 52 wt % aqueous potassium silicate solution, 1.024 parts by weight of TEGO-WET® 251 polyether modified polysiloxane surfactant, and 2.048 parts by weight of GLYCOLUBE® AFA-1.

The coated film was prepared as follows. PET was dried and then melt-extruded into a flat sheet and cooled on a chilled roll to form a substrate layer. The temperature of the cast film was then increased by passing the film over hot rollers (80° C.-85° C.) and heating by infrared heaters. The film was then stretched lengthwise at a draw ratio of 3.4:1. The stretched film was then contacted with chilled rolls (15° C.-25° C.), which reduces the film temperature to minimize crystallization and embrittlement of the film. The film was then roll-coated on both sides with the antifog coating formulation. Wet coating thickness, measured by an infrared gauge, was 7.4 to 9.4 microns. The coated film was dried in a tenter frame in two forced air ovens at about 105° C. The film was then drawn in the transverse direction at a ratio of 3.0:1 to 4.5:1 in two ovens operating at 110° C.-130° C. After drawing, the coated film was heat set for about 8 seconds in three heat-setting ovens operating at between 225° C. and 237° C. In a final cooldown step, the film temperature was reduced in an air oven operating at about 165° C.

Dry coating thickness was 10 to 20 nm as measured on the finished film. The haze value was 0.7. The film showed very good antifog properties, no fog being formed at ambient and refrigerated temperatures.

Example 2

To produce the coating formulation, the following components were added to 98.6 parts by weight of water under agitation:

0.309 parts by weight of a 52 wt % aqueous potassium silicate solution, 0.58 parts by weight of TEGO-WET® 251 polyether modified polysiloxane surfactant, 0.8 parts by weight of GLYCOLUBE® AFA-1, and 0.032 parts by weight of MX-150.

The coating formulation was applied to a polyethylene terephthalate film by manual drawdown using a No. 0 Meyer rod. Dry coating thickness was 10 to 20 nm as measured on the finished film. The haze value was 1.32. The film showed very good antifog properties, no fog being formed at ambient and refrigerated temperatures.

Example 3

To produce the coating formulation, the following components were added to 98.4 parts by weight of water under agitation:

0.295 parts by weight of a 52 wt % aqueous potassium silicate solution, 0.4 parts by weight of TEGO-WET® 251 polyether modified polysiloxane surfactant, 0.80 parts by weight of GLYCOLUBE® AFA-1, and 0.16 parts by weight of XX-1255Z.

The coating formulation was applied to a polyethylene terephthalate film by manual drawdown using a No. 0 Meyer rod. Dry coating thickness was 10 to 20 nm as measured on the finished film. The haze value was 1.51. The film showed very good antifog properties, no fog being formed at ambient and refrigerated temperatures.

Example 4

To produce the coating formulation, the following components were added to 98.4 parts by weight of water under agitation:

0.295 parts by weight of a 52-wt % aqueous potassium silicate solution, 0.4 parts by weight of TEGO-WET® 251 polyether modified polysiloxane surfactant, 0.80 parts by weight of GLYCOLUBE® AFA-1, and 0.16 parts by weight of XX-1269Z.

The coating formulation was applied to a polyethylene terephthalate film by manual drawdown using a No. 0 Meyer rod. Dry coating thickness was 10 to 20 nm as measured on the finished film. The haze value was 1.46. The film showed very good antifog properties, no fog being formed at ambient and refrigerated temperatures.

Comparative Example 5

To produce the coating formulation, the following components were added to 99.7 parts by weight of water under agitation:

0.05 parts by weight of a 52-wt % aqueous potassium silicate solution, and 0.25 parts by weight of TEGO-WET® 251 polyether modified polysiloxane surfactant.

The coating formulation was applied to a polyethylene terephthalate film by manual drawdown using a No. 0 Meyer rod. The film showed fair antifog properties; fog formed at ambient temperature, but disappeared after about ten seconds. The haze value was 0.45. It is believed that the lack of a hydrophilic antifog agent interfered with antifog properties.

Example 6

To produce the coating formulation, the following components were added to 98.94 parts by weight of water under agitation:

0.265 parts by weight of a 52 wt % aqueous K120® potassium silicate solution, 0.4 parts by weight of TEGO® WET 251 polyether modified polysiloxane surfactant, and 0.4 parts by weight of TWEEN®20 polyoxyethylene (20) sorbitan monolaurate.

The coating formulation was applied to a polyethylene terephthalate film by manual drawdown using a No. 0 Meyer rod. The film showed very good antifog properties, no fog being formed at ambient and refrigerated temperatures. The haze value was 1.41.

Comparative Example 7

To produce the coating formulation, the following components were added to 98.94 parts by weight of water under agitation:

0.265 parts by weight of a 52 wt % aqueous K120® potassium silicate solution, 0.4 parts by weight of TEGO® WET 251 polyether modified polysiloxane surfactant, and 0.4 parts by weight of TWEEN®21 polyoxyethylene (4) sorbitan monolaurate.

The coating formulation was applied to a polyethylene terephthalate film by manual drawdown using a No. 0 Meyer rod. The film did not show antifog properties, fog being formed at ambient temperatures. The haze value was 1.17. It is believed that the TWEEN® 21 was not sufficiently hydrophilic to provide good antifog properties.

Example 8

To produce the coating formulation, the following components were added to 98.94 parts by weight of water under agitation:

0.265 parts by weight of a 52 wt % aqueous K120® potassium silicate solution, 0.4 parts by weight of TEGO® WET 251 polyether modified polysiloxane surfactant, and 0.4 parts by weight of WITCOLATE™ WAQE sodium lauryl sulfate.

The coating formulation was applied to a polyethylene terephthalate film by manual drawdown using a No. 0 Meyer rod. The film showed good antifog properties, no fog being formed at ambient temperatures. The haze value was 1.95.

Comparative Example 9

To produce the coating formulation, the following components were added to 98.94 parts by weight of water under agitation:

0.265 parts by weight of a 52 wt % aqueous K120® potassium silicate solution, 0.4 parts by weight of TEGO® WET 251 polyether modified polysiloxane surfactant, and 0.4 parts by weight of SURFYNOL® 420 ethoxylated 2,4,7,9-tetramethyl-5-decyn-4,7-diol.

The coating formulation was applied to a polyethertha late film by manual drawdown using a No. 0 Meyer rod. The film did not show antifog properties, fog being formed at ambient temperatures. The haze value was 2.22. It is believed that the SURFYNOL® 420 was not sufficiently hydrophilic to provide good antifog properties.

Comparative Example 10

To produce the coating formulation, the following components were added to 98.94 parts by weight of water under agitation:

0.265 parts by weight of a 52 wt % aqueous K120® potassium silicate solution, 0.4 parts by weight of TEGO® WET 251 polyether modified polysiloxane surfactant, and 0.4 parts by weight of PVP K-120, 2-Pyrrolidinone, 1-Ethenyl-, Homopolymer.

The coating formulation was applied to a polyethylene terephthalate film by manual drawdown using a No. 0 Meyer rod. The film did not show antifog properties, fog being formed at ambient temperatures. The haze value was 3.68. It is believed that the PVP K-120 was too high in molecular weight to provide good antifog properties.

Comparative Example 11

To produce the coating formulation, the following components were added to 98.94 parts by weight of water under agitation:

0.265 parts by weight of a 52 wt % aqueous K120® potassium silicate solution, 0.4 parts by weight of TEGO® WET 251 polyether modified polysiloxane surfactant, and 0.4 parts by weight of MAZOL® GMO K Kosher glycerol Monooleate.

The coating formulation was applied to a polyethylene terephthalate film by manual drawdown using a No. 0 Meyer rod. The film did not show antifog properties, fog being formed at ambient temperatures. It is believed that the MAZOL® GMO K was not sufficiently hydrophilic to provide good antifog properties.

Comparative Example 12

To produce the coating formulation, the following components were added to 98.94 parts by weight of water under agitation:

0.265 parts by weight of a 52 wt % aqueous K120® potassium silicate solution, 0.4 parts by weight of TEGO® WET 251 polyether modified polysiloxane surfactant, and 0.4 parts by weight of S-MAZ® 60K Flake sorbitan Monostearate Kosher.

The coating formulation was applied to a polyethylene terephthalate film by manual drawdown using a No. 0 Meyer rod. The film did not show antifog properties, fog being formed at temperatures. It is believed that the S-MAZ® 60K was not sufficiently hydrophilic to provide good antifog properties.

Example 13

To produce the coating formulation, the following components were added to 98.07 parts by weight of water under agitation:

0.53 parts by weight of a 52 wt % aqueous K120® potassium silicate solution, 0.6 parts by weight of TEGO® WET 251 polyether modified polysiloxane surfactant, and 0.8 parts by weight of GLYCOLUBE® AFA-1.

The coating formulation was applied to a polyethylene terephthalate film by manual drawdown using a No. 0 Meyer rod. The film showed excellent antifog properties, no fog being formed at ambient and refrigerated temperatures. The haze value was 1.33.

Comparative Example 14

To produce the coating formulation, the following components were added to 98.27 parts by weight of water under agitation:

0.53 parts by weight of a 52 wt % aqueous K120® potassium silicate solution, 0.4 parts by weight of TEGO® WET 251 polyether modified polysiloxane surfactant, and 0.4 parts by weight of PRIMAFLO® HP22 polymer solution hydroxypropylcellulose.

The coating formulation was applied to a polyethylene terephthalate film by manual drawdown using a No. 0 Meyer rod. The film did not show antifog properties, fog being formed at ambient temperature. It is believed that the PRIMAFLO® HP22 was not sufficiently hydrophilic and/or too high in molecular weight to provide good antifog properties.

Comparative Example 15

To produce the coating formulation, the following components were added to 98.27 parts by weight of water under agitation:

0.53 parts by weight of a 52 wt % aqueous K120® potassium silicate solution, 0.4 parts by weight of TEGO® WET 251 polyether modified polysiloxane surfactant, and 0.4 parts by weight of Poly(acrylamide-acrylic acid, Na salt) 40% carboxyl 2-propenoic acid, sodium salt, polymer with 2-propenamide.

The coating formulation was applied to a polyethylene terephthalate film by manual drawdown using a No. 0 Meyer rod. The film did not show antifog properties, fog being formed at ambient temperature. It is believed that the Poly(acrylamide-acrylic acid, Na salt) was too high in molecular weight to provide good antifog properties.

Example 16

To produce the coating formulation, the following components were added to 98.07 parts by weight of water under agitation:

0.53 parts by weight of a 52 wt % aqueous K120® potassium silicate solution, 0.6 parts by weight of TEGO® WET 251 polyether modified polysiloxane surfactant, and 0.8 parts by weight of BYK® 348 polyether modified dimethylpolysiloxane copolymer.

The coating formulation was applied to a polyethylene terephthalate film by manual drawdown using a No. 0 Meyer rod. The film showed very good antifog properties, no fog being formed at ambient and refrigerated temperatures. The haze value was 1.46.

Although the invention is illustrated and described herein with reference to specific embodiments, the invention is not intended to be limited to the details shown. Rather, various modifications may be made in the details within the scope and range of equivalents of the claims without departing from the invention.

What is claimed is:

1. A composite film comprising a polyester film substrate having first and second sides, and on at least one of said first and second sides a coating composition comprising an alkali metal silicate, a wetting agent, and a hydrophilic antifog agent, wherein the hydrophilic antifog agent has a molecular weight no greater than 20,000 Daltons.

2. The composite film of claim 1, wherein the coating is on both of the first and second sides.

3. The composite film of claim 1, wherein the alkali metal silicate is potassium silicate.

4. The composite film of claim 1, wherein the wetting agent is a polyether modified polysiloxane surfactant.

5. The composite film of claim 1, wherein the alkali metal silicate is potassium silicate, the wetting agent is a polyether modified polysiloxane surfactant, and the hydrophilic antifog agent has three or more polyoxyethylene chains.

6. A composite film comprising a polyester film substrate having first and second sides, and on at least one of said first and second sides a coating composition comprising an alkali metal silicate, a wetting agent, and a hydrophilic antifog agent, wherein the hydrophilic antifog agent comprises a compound having three or more polyoxyethylene chains.

7. A method of making the composite film of claim 1, comprising the steps of:
   a) providing an unoriented or monoaxially oriented polyester film substrate having first and second sides;
   b) forming on at least one of said first and second sides a layer of the coating composition comprising the alkali metal silicate, the wetting agent, and the hydrophilic antifog agent, said forming comprising contacting said at least one side with a dispersion of the coating composition in an aqueous diluent and then evaporating the diluent; and c) subsequent to step b), stretching the unoriented or monoaxially oriented polyester film substrate to respectively monoaxially or biaxially orient the substrate.

8. The method of claim 7, further comprising, after step c), d) heat setting the polyester substrate.

9. The method of claim 7, wherein the substrate of step a) is monoaxially oriented.

10. The method of claim 7, wherein step b) comprises forming a layer of the coating composition on both of the first and second sides.

11. The method of claim 7, wherein the alkali metal silicate is potassium silicate.

12. The method of claim 7, wherein the wetting agent is a polyether modified polysiloxane surfactant.

13. The method of claim 7, wherein the hydrophilic antifog agent comprises a compound having three or more polyoxyethylene chains.

14. The method of claim 7, wherein the alkali metal silicate is potassium silicate, the wetting agent is a polyether modified polysiloxane surfactant, and the hydrophilic antifog agent comprises a compound having a molecular weight no greater than 20,000 Daltons having three or more polyoxyethylene chains.

* * * * *